United States Patent [19]

Itoh et al.

[11] E Patent Number: Re. 33,355

[45] Reissued Date of Patent: Sep. 25, 1990

[54] AGENT FOR ABSORBING AND RELEASING WATER VAPOR

[75] Inventors: Hiroshi Itoh, Yokohama; Toshimi Nakagawa, Fujisawa; Atsuhiko Nitta, Yokohama; Tomio Tanaka, Tokyo; Hideo Kamio, Odawara; Ryosuke Enoshita, Nagoya; Tamotu Uejima, Tohkai; Takahiro Ouchi, Tokyo; Kazuki Abe; Sadao Kobayashi, both of Yokohama, all of Japan

[73] Assignee: Mitsui Toatsu Chemicals, Incorporated, Tokyo, Japan

[21] Appl. No.: 194,965

[22] Filed: May 16, 1988

Related U.S. Patent Documents

Reissue of:

[64] Patent No.: 4,683,258
Issued: Jul. 28, 1987
Appl. No.: 820,887
Filed: Jan. 17, 1986

U.S. Applications:

[63] Continuation of Ser. No. 724,163, Apr. 17, 1985, abandoned.

[30] Foreign Application Priority Data

| | | | |
|---|---|---|---|
| Oct. 22, 1983 | [JP] | Japan | 58-197875 |
| May 28, 1984 | [JP] | Japan | 59-106468 |
| May 28, 1984 | [JP] | Japan | 59-106550 |
| May 28, 1984 | [JP] | Japan | 59-106551 |
| May 28, 1984 | [JP] | Japan | 59-106554 |
| May 28, 1984 | [JP] | Japan | 59-106463 |

[51] Int. Cl.[5] ..... C08K 3/18; B05D 5/06

[52] U.S. Cl. ..... 524/434; 524/436; 526/303.1; 428/441; 427/164; 427/165; 106/13

[58] Field of Search ..... 524/434, 436; 428/441; 427/165, 165; 106/13; 526/303.1

[56] References Cited

U.S. PATENT DOCUMENTS

| | | | |
|---|---|---|---|
| 3,043,822 | 7/1962 | Maeder | 526/305 X |
| 3,075,956 | 1/1963 | Shields et al. | 526/169.3 |
| 3,515,579 | 6/1970 | Shephard et al. | 106/13 |
| 3,926,930 | 12/1975 | Ohfuka et al. | 526/303.1 X |
| 3,927,199 | 12/1975 | Micchelli et al. | 526/303.1 X |
| 4,018,939 | 4/1977 | Merrill et al. | 427/165 |
| 4,080,476 | 3/1978 | Laskey | 428/441 |
| 4,526,947 | 7/1985 | Castner | 526/303.1 X |
| 4,720,308 | 6/1981 | Mitsuishi et al. | 264/235.8 |

FOREIGN PATENT DOCUMENTS

| | | | |
|---|---|---|---|
| 58-201810 | 11/1983 | Japan | 526/303.1 |
| 58-206654 | 12/1983 | Japan | 526/303.1 |

*Primary Examiner*—Paul R. Michl
*Assistant Examiner*—Jeffrey A. Lindeman
*Attorney, Agent, or Firm*—Oblon, Spivak, McClelland, Maier & Neustadt

[57] ABSTRACT

Disclosed herein is an agent for absorbing and releasing water vapor, which comprises a homopolymer of at least one monomer selected from specific N-alkyl- or N-alkylene-substituted acrylamides and methacrylamides, a copolymer of two or more of the acrylamides and methacrylamides, a copolymer of said at least one monomer with one or more monomers other than the acrylamides and methacrylamides and copolymerizable therewith, or a water-insolubilized product of the homopolymer or either one of the copolymers. The above agent has broad utility for humidity control of gases, humidity control in green houses and prevention of fogging on surfaces of transparent materials, as humidity sensors and dew sensors, etc.

14 Claims, No Drawings

AGENT FOR ABSORBING AND RELEASING WATER VAPOR

Matter enclosed in heavy brackets [ ] appears in the original patent but forms no part of this reissue specification; matter printed in italics indicates the additions made by reissue.

This application *is a reissue of Ser. No. 06/820,887 filed Jan. 17, 1986, now U.S. Pat. No. 4,683,258, issued July 28, 1987, which* is a continuation of application Ser. No. 724,163, filed Apr. 17, 1985, now abandoned.

BACKGROUND OF THE INVENTION

1. Field of the Invention:

This invention relates to an agent for absorbing and releasing water vapor and more specifically, to an agent for absorbing and releasing water vapor, which agent has such hygroscopic capacity that varies significantly in degree depending on the temperature and releases water vapor easily when heated.

2. Description of the Prior Art:

No satisfactory methods have been proposed to date for the control in amount of water vapor in the air, namely, for humidity control or for the prevention of moisture condensation, for example, for the prevention of fogging. No development has hitherto been made as to sensors which can detect with good accuracy the humidity in the air, moisture condensation and the like.

In methods which have conventionally been relied upon for the control of humidity in a gas, the humidity control is primarily effected by operating an apparatus with two different types of functions, namely, dehumidification and humidification while making selective use of these two functions. Compared with temperature control, extremely complex apparatus and very irksome work are thus required for the practice of such conventional methods.

No complete solution has hence been provided as to problems which arise due to changes in room temperature in closed space featuring limited degrees of entry of the external air such as green houses, vinyl plastic hothouses, buildings and the like, such as moisture condensation. These problems have been inducing various troubles such as development of disease injury due to moisture condensation in green houses, malfunctions of electronic equipment such as computers in offices housed in buildings, etc. On the other hand, it is important to moisturize soil when raising crops on arid land or on soil having poor water-holding capacity. For this purpose, various moisturizing materials such as water-holding agents for soil have been investigated.

For the above-mentioned problems or demands, a new concept which is different from the conventional concept on air conditioning has recently been developed, for example, by making use of a hydrophilic polymer having hygroscopic capacity such as sodium polyacrylate or polyvinyl alcohol for the control of humidity or moisture. A variety of such hydrophilic polymers have been prepared on trial basis. Generally, these polymers have strong hygroscopic capacity. Their demoisturizing or dehumidifying capacity are thus strong. However, they are scarce of such capacity as maintaining given moisture or humidity levels or increasing moisture or humidity levels. They are therefore insufficient for moisture or humidity control. Except for the above-mentioned shortcoming, the moisture- or humidity-controlling method making use of such polymers has excellent merits in various aspects such as equipment cost, maintenance, installation space and the like, which conventional methods were unable to bring about.

Making use of their transparency, transparent materials such as inorganic glass, transparent ceramics and plastic materials have conventionally been used for various applications including for example window glass for houses and buildings, window glass for trains, tram cars and other passenger vehicles, mirrors, eye glasses, goggles, etc. As one of serious drawbacks of these products, may be mentioned that water vapor is caused to condense as minute droplets on their surfaces and as a result, the surfaces are clouded at hot and humid places. Various obstacles or troubles are developed especially when window glass, eye glasses, mirrors and the like are clouded on their surfaces.

A variety of attempts have been made to date for the solution of the above problem. For example, it has been studied to coat or spray various surfactants, polymers of hydroxyl-substituted (meth)acrylates, polymers of (meth)acrylates containing polyalkylene glycols substituted on their side chains, various silicon compounds such as dimethyl siloxane either singly or in combination. None of such methods are however fully satisfactory.

Turning to temperature sensors, a variety of materials led by bimetals have been known as materials for temperature sensors. They all enjoy good sensitivity and accuracy. A variety of sensors which are easy to use have thus been developed and are employed for various applications. Different from temperature sensors, no fully satisfactory humidity or dew sensors have yet been obtained despite the development of various sensors because humidity is by itself correlated to temperature and no excellent detection method has been developed for the direct detection of water vapor.

SUMMARY OF THE INVENTION

An object of this invention is to provide an agent for absorbing or releasing water vapor, which has such hygroscopic capacity that varies significantly in degree depending on the temperature and when heated, can easily release a relatively large amount of water which has been absorbed at a relatively low temperature.

Another object of this invention is to provide an agent for absorbing and releasing water vapor, which is useful for the control of humidity in a gas.

A further object of this invention is to provide an agent for absorbing and releasing water vapor, which may be formed into sheets or beads and are usable, as is in the case of sheets or after filled in containers in the case of beads, for the control of humidity in green houses or moisture in soil.

A still further object of this invention is to provide an agent for absorbing and releasing water vapor, which is usable for the prevention of moisture condensation on the surfaces of transparent materials such as glass, plastics and the like so that such surfaces are kept free from fogging or clouding.

A still further object of this invention is to provide an agent for absorbing and releasing water vapor, which is usable as a humidity or dew sensor which is in turn suitable for indoor use, for example, in green houses.

The present invention provides the following agent which is useful in absorbing and releasing water vapor:

An agent for absorbing and releasing water vapor, comprising a homopolymer of at least one monomer selected from N-alkyl- or N-alkylene-substituted (meth-)acrylamides represented by the following general formula (I) or (II):

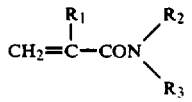

(I)

wherein $R_1$ means a hydrogen atom or methyl group, $R_2$ denotes a hydrogen atom or methyl or ethyl group, and $R_3$ is a methyl, ethyl or propyl group, or

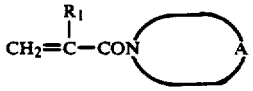

(II)

wherein $R_1$ means a hydrogen atom or methyl group and A denotes $-(CH_2)_n$ (n: 4–6) or $-(CH_2)_2-O-$ a first copolymer of two or more monomers selected from the N-alkyl- or N-alkylene-substituted (meth)acrylamides, a second copolymer of at least one monomer selected from the N-alkyl- or N-alkylene-substituted (meth)acrylamides and one or more monomers other than the N-alkyl- or N-alkylene-substituted (meth)acrylamides and copolymerizable with the N-alkyl- or N-alkylene-substituted (meth)acrylamides, or a water-insolubilized product of the homopolymer or the first or second copolymer.

DETAILED DESCRIPTION OF THE INVENTION

The homopolymer or copolymer in the present invention has typically such a property that when its aqueous solution is progressively heated, it is rendered hydrophobic and the aqueous solution thus develops turbidity. However, the homopolymer or copolymer is not necessarily limited to that having such a property. Any homopolymer or copolymer may be employed so long as its hygroscopic capacity varies in accordance with temperature. Such homopolymers and copolymers have amphiphilic properties, so that they are both hydrophilic and hydrophobic as demonstrated for example by their solubility in both water and an organic solvent such as benzene.

As examples of the above-described homopolymer and copolymers, may be mentioned homopolymers and copolymers of at least one of the following N-alkyl- or N-alkylene-substituted (meth)acrylamides:

N-n-Propylacrylamide;
N-n-Propylmethacrylamide;
N-Isopropylacrylamide;
N-Isopropylmethacrylamide;
N-Ethylacrylamide;
N,N-Diethylacrylamide;
N-Ethylmethacrylamide;
N,N-dimethylacrylamide;
N,N-dimethylmethacrylamide;
N-Methyl-N-ethylacrylamide;
N-Acryloylpyrrolidine;
N-Methacryloylpyrrolidine;
N-Acryloylpiperidine;
N-Methacryloylpiperidine;
N-Acryloylmorpholine; and
N-Methacryloylmorpholine.

In addition, one or more monomers selected from for example hydrophilic monomers, ionic monomers and hydrophobic monomers may additionally be copolymerized in order to control the amount of water vapor to be absorbed and to improve the shape-retaining capacity of the water vapor-absorbed polymer.

As exemplary hydrophilic monomers, may be mentioned acrylamide, methacrylamide, N-methylacrylamide, N-methylmethacrylamide, diacetoneacrylamide, hydroxyethyl methacrylate, hydroxyethyl acrylate, hydroxypropyl methacrylate, hydroxypropyl acrylate, various methoxypolyethyleneglycol methacrylates, various methoxpyolyethyleneglycol acrylates, N-vinyl-2-pyrrolidone, N-acryloyl alanine and N-methacryloyl alanine. Further, vinyl acetate or glycidyl methacrylate for example may be introduced by copolymerization, followed by hydrolysis to impart hydrophilicity.

Illustrative of such ionic monomers are acids such as acrylic acid, methacrylic acid, vinylsulfonic acid, allylsulfonic acid, methallylsulfonic acid, styrenesulfonic acid, 2-acrylamido-2-phenylpropanesulfonic acid and 2-acrylamido-2-methyl-propanesulfonic acid and their salts; amines such as N,N-dimethylaminoethyl methacrylate, N,N-diethylaminoethyl methacrylate, N,N-dimethylaminoethyl acrylate, N,N-dimethylaminopropyl methacrylamide and N,N-dimethylaminopropylacrylamide and their salts. Further, it is also possible to impart ionic properties by introducing various acrylates, methacrylates, acrylamides, methacrylamides or acrylonitriles by copolymerization and then hydrolyzing the thus-introduced moieties.

As hydrophobic monomers, may for example be mentioned N-alkylacrylamide derivatives and N-alkylmethacrylamide derivatives such as N-n-butylacrylamide, N-n-butylmethacrylamide, N-tert-butylacrylamide, N-tert-butylmethacrylamide, N-n-hexylacrylamide, N-n-hexylmethacrylamide, N-n-octylacrylamide, N-n-octylmethacrylamide, N-tert-octylacrylamide, N-n-dodecylacrylamide, N-n-dodecylmethacrylamide, N-n-dodecylacrylamide, N-n-dodecylmethacrylamide and the like; N-N-diglycidylacrylamide, N,N-diglycidylmethacrylamide; N-(ω-glycidoxyalkyl)acrylamide derivatives and N-(ω-glycidoxyalkyl)methacrylamide derivatives such as N-(4-glycidoxybutyl)acrylamide, N-(4-glycidoxybutyl)methacrylamide, N-(5-glycidoxyacrylamide, N-(6-glycidoxyhexyl)acrylamide and the like; acrylate derivatives and methacrylate derivatives such as ethyl acrylate, methyl methacrylate, butyl methacrylate, butyl acrylate, lauryl acrylate, 2-ethylhexyl methacrylate and glycidyl methacrylate; acrylonitrile; methacrylonitrile; vinyl acetate; vinyl chloride; olefins such as ethylene, propylene and butene; styrene; α-methylstyrene; butadiene; and isopropene.

The acceptable proportion of such a hydrophilic, ionic or hydrophobic monomer to the acrylamide or methacrylamide derivatives may vary depending on the combination of the acrylamide or methacrylamide derivative and the above-mentioned monomer. Although not sweepingly applicable to every combination, the hydrophilic, ionic and hydrophobic monomers may generally be used in amounts of 60 wt. % or less, 30 wt. % or less and 60 wt. % or less, respectively.

As specific polymerization processes for the above-described monomers, may be mentioned (1) to polymerize them in an aqueous solution to obtain the resultant aqueous polymer solution as is or after drying the aqueous polymer solution and then driving water off from the aqueous polymer solution, to obtain as a solid polymer; (2) after their polymerization in a solvent, to obtain the resultant polymer solution as is or to obtain the polymer by effecting such a procedure as driving the solvent off or adding the resultant polymer solution to a poor solvent to cause the polymer to precipitate; (3) to obtain their polymer as a polymer emulsion in accordance with emulsion polymerization; (4) to obtain their polymer as polymer particles in accordance with suspension polymerization; and (5) to polymerize the monomers as they are without diluting them with a solvent to obtain the resultant polymer as a polymer block.

Among polymers obtained in the above-described manner, those obtained in solid forms may be dissolved in desired solvent to provide them as solutions or may be ground to provide them in powdery forms. The solutions may be aqueous solutions or solutions of such organic solvents as described above.

If polymers are water-soluble, they may absorb water and may hence run as aqueous solutions, thereby causing problems. Such polymers may be used after their insolubilization.

As specific insolubilizing methods, the following various methods may be employed:

(1) to copolymerize a crosslinkable monomer containing at least two double bonds per molecule with the above-described acrylamide or methacrylamide derivatives;

(2) to copolymerize the polymer with N-alkoxymethyl(meth)acrylamide derivatives;

(3) to increase the proportion of the above-mentioned hydrophobic monomer and to copolymerize it with acrylamide or methacrylamide derivatives;

(4) to effect polymerization by the bulk polymerization method;

(5) to subject the polymer to a heat treatment;

(6) to integrate the polymer with a water-insoluble fibrous material such as cellulose or a water-insoluble porous material;

(7) when the polymer contains for example hydroxyl, amino or carboxyl groups, to cause such groups with a polyfunctional compound such as epichlorohydrin to insolubilize the polymer; and (8) to copolymerize the monomer represented by the general formula (I) with a monomer containing a substituent group such as carboxyl group, sulfo group or hydroxyl group having at least one active hydrogen atom or to form the polymer of the monomer represented by the general formula (I) and a polymer of the above monomer into a polymer complex, thereby insolubilizing the polymer.

The above insolubilizing methods will next be described more specifically.

In the first method, it is possible to use as exemplary crosslinkable monomers N,N'-methylenebisacrylamide, N,N-diallylacrylamide, triacrylic formal, N,N-diacryloylimide, N,N-dimethacryloylimide, ethyleneglycol acrylate, ethyleneglycol dimethacrylate, various polyethyleneglycol diacrylates, various polyethyleneglycol dimethacrylates, propyleneglycol diacrylate, various polypropyleneglycol diacrylates, various polypropyleneglycol dimethacrylates, 1,3-butyleneglycol diacrylate, 1,3-butyleneglycol dimethacrylate, 1,4-butyleneglycol dimethacrylate, glycerol dimethacrylate, neopentylglycol dimethacrylate, trimethylolpropane triacrylate, trimethylolpropane trimethacrylate, trimethylolethane trimethacrylate, trimethylolethane triacrylate, tetramethylolmethane tetramethacrylate, tetramethylolmethane triacrylate, divinylbenzene and diallyl phthalate. The proportion of each of these crosslinkable monomers to the above described acrylamide derivative may vary depending on the combination of the acrylamide derivative and crosslinkable monomer as well as the desired crosslinking degree. Although not applicable sweepingly to every situation, the crosslinkable monomers may each be used in an amount of 0.01–10 wt. %.

N-Alkoxymethyl(meth)acrylamide derivatives useful in the practice of the second method may include N-hydroxymethyl(meth)acrylamides. For example, N-methylol(meth)acrylamides, N-methoxymethyl(meth)acrylamides, N-ethoxymethyl(meth)acrylamides, N-n-butoxymethyl(meth)acrylamides and N-tert-butoxymethyl(meth)acrylamides may be used. The proportion of each of such N-alkoxymethyl(meth)acrylamide derivatives to the above-described acrylamide derivatives may vary depending on the combination of the acrylamide derivatives and the N-alkoxymethyl(meth)acrylamide derivatives. Although not applicable sweepingly to every combination, the N-alkoxymethyl(meth)acrylamide derivatives may each be used generally in an amount of 0.01–30 wt. %.

In the third method, the proportion of the hydrophobic monomer to the (meth)acrylamide derivative havin amphiphilic property may vary depending on the combination of the (meth)acrylamide derivative and the hydrophobic monomer. Although not conclusively limitable, the proportion of the hydrophobic monomer may generally be 1 wt. % or more, or preferably 3 wt. % or more. In this case, the copolymerization may be effected using one of the random copolymerization method, block copolymerization method or graft copolymerization method.

In the fourth method, the polymerization is carried out by the bulk polymerization method. This may be practiced by polymerizing the monomer as is without diluting it with any solvent to obtain a polymer block or by suspending the monomer in a solvent and then effecting the polymerization of the monomer in the form of droplets so as to obtain a granular polymer.

In the fifth method, the polymer is subjected to a heat treatment. The heating conditions may vary depending on the polymer and do not remain constant. However, a polymer obtained by for example bulk polymerization, suspension polymerization or solution polymerization is heat-treated generally at 60°–250° C., or preferably at 80°–200° C. In this case, when the polymer is obtained by the solution polymerization method, its heat treatment may be carried out concurrently with its drying or with the evaporation of the solvent.

Turning to the sixth method in which the polymer is integrated with for example a fibrous material, the above-described (meth)acrylamide derivative may be impregnation- or graft-polymerized to a water-insoluble fibrous material such as natural or synthetic fibers such as cellulose fibers, nylon fibers, polyester fibers or acrylic fibers or non-woven fabric made of polypropylene or an ethylene-propylene copolymer, or to a water-insoluble porous material such as silica, alumina or zeolite. Alternatively, the fibrous or porous material may be impregnated with the polymer.

In the seventh method, the polyfunctional compound such as epichlorohydrin is reacted with the polymer so that the polymer is crosslinked and insolubilized. In this method, it is necessary to introduce hydroxyl, amino or carboxyl groups in advance in the polymer. Amino and carboxyl groups can be introduced readily by copolymerization. In the case of hydroxyl groups, they may be introduced by copolymerizing hydroxyethyl methacrylate, isopropenyl phenol, or by first introducing for example vinyl acetate or glycidyl methacrylate by the copolymerization method and then saponifying it with a basic material to form hydroxyl groups. Thereafter, the above-prepared polymer and a polyfunctional compound such as epichlorohydrin are reacted to each other so as to crosslink and insolubilize the polymer. When the polymer is insolubilized in an aqueous solution as is, it is converted into an agar-like state. By simply crushing the thus-obtained polymer, it can be used immediately. If it is solubilized after dispersing the aqueous solution in an oil, granular gels are obtained.

According to the eighth method, a polymer complex is formed by copolymerizing the polymer with the above-described monomer containing an active hydrogen or combining the polymer with a copolymer of such a monomer. In this case, it is also possible to form polymer complex by regenerating the active hydrogen atoms of the copolymer which are substituted with ammonium ions or the like by the addition of an acid.

The above-described eight methods may be used singly or in combination. Generally speaking, more effective results are obtained when two or more of these methods are used in combination.

As more specific polymerization methods which may be used upon production of agents of this invention in accordance with the above-mentioned methods, the following polymerization methods may be mentioned by way of example:

(1) to polymerize a monomer as is without diluting it in a solvent and to produce a polymer block;

(2) after polymerizing in a solvent, to dry the resultant polymer or to cause the polymer to precipitate in a poor solvent, thereby obtaining the polymer;

(3) to obtain the polymer as a granular polymer in accordance with the suspension polymerization method;

(4) to obtain the polymer as a polymer latex in accordance with the emulsion polymerization method; and (5) to integrate the polymer with a water-insoluble fibrous material or porous material by impregnation- or graft-polymerizing a solution of the polymer to the water-insoluble fibrous material or porous material.

As solvents usable upon polymerization in the method (2), it is possible to use a variety of solvents. Because (meth)acrylamide and their N-substituted derivatives have very good miscibility with such various solvents. More specifically, may be mentioned alcohols such as methanol and ethanol, cyclic ethers such as tetrahydrofuran and 1,4-dioxane, ketones such as acetone, amides such as N,N-dimethylformamide and N,N-dimethylacetamide, aromatic hydrocarbons such as benzene and toluene, halogenated hydrocarbons such as chloroform and methylene dichloride, dimethyl sulfoxide, N-methylpyrrolidone, diglyme and tetraglyme, basic solvents such as pyridine, etc.

In the above specific polymerization methods, the polymerization may be initiated only by heating the polymerization systems. However, use of a polymerization initiator can generally bring about better results. No limitation is imposed on the polymerization initiator. Any polymerization initiators may be used as long so they can initiate radical polymerization. For example, inorganic peroxides, organic peroxides, combinations of such peroxides and reducing agents, and azo compounds may be mentioned. More specifically, such polymerization initiators may include ammonium persulfate, potassium persulfate, hydrogen peroxide, tert-butyl peroxide, benzoyl peroxide, cumenehydroxy peroxide, tert-butylperoxy-2-ethyl hexanoate, and butyl perbenzoate. As reducing agents which may be used in combination with such polymerization initiators, may be mentioned sulfites, hydrogensulfites, salts of lower valence metals such as iron, copper and cobalt, organic amines such as aniline and reducing sugars such as aldose and ketose. Usable, azo compounds may include azobisisobutyronitrile 2,2'-azobis-2-amidinopropane hydrochloride, 2,2'-azobis-2,4-dimethylvaleronitrile and 4,4'-azobis-4-cyanovaleic acid. Two or more of the above-described polymerization initiators may be used in combination. In this case, the amount of the polymerization initiator to be added may be within the commonly-employed amount range, for example, may be within the range of 0.01–5 wt. %, or preferably 0.05–2 wt. %, both based on the monomer.

Among the thus-obtained polymers, the block-like polymer or the polymer obtained after evaporation of the solvent may be crushed into a powdery agent or may be melted and then formed into a flake-, fiber- or film-like agent. The granular polymer may be provided as a granular agent without need for any further processing. The latex-like polymer may be provided to impregnate and coat a fibrous or porous material such as fabric or paper or may be formed into films to provide an agent for absorbing and releasing water vapor.

In the manner mentioned above, the water-insolubilized polymer or copolymer (hereinafter called "the resin" for the sake of brevity) can be obtained in various forms. The particular form of the resin may suitably be determined depending on how the resin is to be used. When used for example in a form suspended or dispersed in a liquid as in a fluidized bed, it may often be used in the form of powder or beads.

A powdery product may be obtained by various methods as described above, for example, by conducting gel polymerization in an aqueous solution and then drying and grinding the resultant resin. A granular product may generally be produced with ease in accordance with the suspension polymerization method. Since the N-alkyl- or N-alkane-substituted (meth)acrylamide derivative has generally high solubility in water, suspension polymerization may be practiced as the reversed phase suspension technique in which a monomer or its aqueous solution is dispersed in an oil, as the salted-out suspension polymerization technique in which an electrolyte is dissolved in a large amount in an aqueous solution to reduce the solubility of a monomer, or as the precipitation and suspension polymerization technique in which polymerization is carried out at an elevated temperature of the cloud point of the intended polymer or higher so as to cause the polymer to precipitate. In addition, it is also possible to integrate the polymer with porous beads such as silica, alumina or zeolite, for example, by impregnating the porous beads with a solution of the polymer or effecting graft polymerization on such porous beads. It is also possible to incorporate a third component miscible with the monomer or monomers but immiscible with the resulting polymer when conducting polymerization in accordance with one of the above-mentioned polymerization techniques. Incorporation of such a third component permits production of a porous resin.

The thus-prepared agents for absorbing and releasing water vapor are in solid forms. Upon contact with gaseous water, for example, water vapor, they absorb and hold water therein. They can absorb and release water depending on the humidity and temperature of the surrounding atmosphere. This process can be repeated. Since more water vapor or moisture can generally be absorbed at lower temperatures that at higher temperatures, it is feasible to have them serve as dehumidifiers or demoisturizers at lower temperatures and as humidifiers or moisturizers at higher temperatures. Thus, they have such functions that changes in relative humidity or moisture level due to temperature variations are reduced so as to maintain the relative humidity or moisture level constant.

The amount of water vapor or moisture to be absorbed by a polymer may change depending on the composition of the polymer and the temperature and humidity of the surrounding atmosphere. Taking the polymer composition for example, the amount of water vapor or moisture to be absorbed in a copolymer of a hydrophobic monomer out of the above-described copolymerizable monomers decreases and the mechanical strength of the copolymer is increased as the proportion of the hydrophobic monomer increases. In the case of a copolymer of a hydrophilic or ionic monomer, the amount of water vapor or moisture to be absorbed in the copolymer per se increases as the proportion of the hydrophilic or ionic monomer goes up. However, the amount of water vapor or moisture to be absorbed becomes less dependent on the temperature. Its mechanical strength is also lowered.

Furthermore, it is possible to increase the amount of water vapor or moisture to be absorbed in the agent of this invention by integrating the agent with a material having hygroscopic capacity. Usable hygroscopic materials may be either inorganic compounds or organic compounds. Inorganic compounds are preferred because many of them are more economical and have high hygroscopic capacity. Any material can be employed, so long as it has hygroscopic capacity. As specific hygroscopic materials, may be mentioned metal hydrides such as calcium hydride, sulfates such as magnesium sulfate, calcium sulfate, sodium sulfate and copper sulfate, halides such as calcium chloride, calcium bromide, magnesium chloride and zinc chloride, perchlorates such as magnesium perchlorate, barium perchlorate and sodium perchlorate, oxides such as calcium oxide, magnesium oxide, barium oxide, phosphorus pentoxide, alumina and silica, inorganic acids such as phosphoric acid and sulfuric acid, molecular sieves, etc. The amounts of these hygroscopic agents to be added vary depending what end use will be made on the resulting products, and cannot be defined sweepingly. If they are added in excessively small amounts, their effects will be brought about to any noticeable degrees. If they are added too much, the moisture-releasing capacity which is characteristic to the present invention will be impaired although the moisture-absorbing capacity will be increased. Such a hygroscopic material may usually amount to 3–97 wt. % or most preferably 5–75 wt. % of the composition of the absorbing and releasing agent. It is a great feature of this invention that even if the hygroscopic material is added in such a large amount, the moisture-releasing capacity of the agent will not be greatly lowered. The transfer of absorbed water is believed to take place between the hygroscopic material and the polymer. There are several methods for producing an agent for absorbing and releasing water vapor by integrating hydroscopic material with the polymer. They may be integrated together by causing the hygroscopic material to be present concurrently upon polymerization, by kneading the hygroscopic material with the polymer, or by molding the polymer and hygroscopic material together.

The amount of moisture to be absorbed by an agent prepared in the above manner varies depending on the composition of the polymer and temperature and humidity conditions. It can usually absorb water vapor approximately in an amount 0.1–10 times its own weight. Water vapor may be released promptly by placing the moisture-absorbed agent in an atmosphere of a higher temperature or lower humidity. In the above manner, the absorption of moisture or water vapor and its release may be effected promptly by changing its surrounding environmental conditions. As one of features of this invention, it may be possible to mention especially that the water vapor or moisture releasing rate may be set at the same level as or faster than the water vapor or moisture absorbing rate. This is property which cannot be observed with conventional water vapor or moisture absorbents.

When the absorbing and releasing agent is used repeatedly, more water is allowed to remain in the absorbing and releasing agent as the amount of water absorbable in the agent increases. No serious problem will however be encountered upon using the absorbing and releasing agent repeatedly, because the difference between the amount of water absorbed in the agent and that still remained after release of water from the agent also increases as the amount of water absorbable in the agent increases. Therefore, the water vapor absorbing and releasing agent of this invention permits easy control on the amount of moisture to be absorbed. It is thus possible to perform the humidity control of a large volume of a gas in the presence of a small amount of the absorbing and releasing agent.

The water vapor absorbing and releasing agent of this invention may therefore be applied as humidity-controlling agents for the humidification, dehumidification and humidity maintenance of gases and for the prevention of moisture condensation on walls and the like, as antifogging agents for glasses and the like, as humidity and dew sensors, etc.

As a specific method for controlling the humidity with the water vapor absorbing and releasing agent of this invention, it is only necessary to keep it in contact with a gas the humidity of which is to be controlled.

No particular limitation is imposed on the shape of the absorbing and releasing agent. It may be used in form of flakes, fibrous forms or film-like forms or as composite materials between the thus-formed products with other fibrous materials, depending what end use will be made thereon. When used in such forms, it can humidify or dehumidify the atmosphere in accordance with the temperature and humidity of the atmosphere. The humidification and dehumidification can be performed repeatedly many times in accordance with temperature and/or humidity changes in the atmosphere.

As more specific humidity-controlling methods, the following two methods may primarily be employed:

(1) to place the absorbing and releasing agent in the atmosphere and to perform its humidity control relying upon the humidity-controlling function of the absorbing and releasing agent; and (2) to effect the humidity control by controlling the temperature of the absorbing and releasing agent.

When using the absorbing and releasing agent in a powdery, granular or flake-like form in accordance with the method (1), it is necessary to bring the absorbing and releasing agent into contact with a gas in such a fashion as fixed bed, fluidized bed or moving bed. In the method (2), it is required to heat or cool the absorbing and releasing agent by such a heating method as external heat exchange or internal heat exchange while following the above-mentioned fashion. On the other hand, when it is employed in a fibrous or film-like form or as a composite material between such fibers or films and other fibrous or film-like material, it may be adhered on walls like wall paper or may be hung as curtains hung down from the ceiling of a room or curtains spread over windows of the room. Anyway, it is only necessary to keep the absorbing and releasing agent in sufficient contact with moisture in a gas. If one wants to employ the method (2) in accordance with this fashion, it is not so simple as the method (1). It may however be possible to form the above absorbing and releasing agent into tubes and then to cause steam, water, a temperature-controlled gas or the like to flow therethrough for their heating or cooling. Where the absorbing and releasing agent is used as window or wall curtains, curtains hung from the ceiling, or wall paper over walls or the like, they may be heated or cooled externally.

It is possible to control the humidity of gas at either high or low level by making suitable selection as to the composition of the polymer and the amount of the absorbing and releasing agent to be employed. When a polymer having high hydrophobicity is employed, the humidity level may be set in a higher humidity range. On the other hand, the humidity level may be set in a lower humidity range when a polymer having high hydrophilicity is used.

As specific utility, the water vapor absorbing and releasing agent of this invention may be used for the control of humidity upon raising crops in closed space such as horticulture under structures making use of green houses, vinyl plastic hothouses or polyinyl chloride films, for the control of humidity in rooms where electronic equipment susceptible to malfunction under high humidity such as computers are installed, for the prevention of moisture condensation on walls, windows and the like in general housing; for the control of moisture level in soil, and for other purposes.

When the water vapor absorbing and releasing agent of this invention is employed for the control of humidity or moisture level, it is first of all possible to perform the control of humidity or moisture level at low costs because the control does not rely upon such a phase transformation as evaporation, condensation or the like. Furthermore, the absorbing and releasing agent does not always require large apparatus and can be placed at desired locations. Secondly, it can perform with ease dehumidification at low temperatures because it can absorb more moisture or water vapor as the temperature goes down. It is thus possible to minimize the range of changes in relative humidity which changes take place in accordance with variations in the temperature. Thirdly, the absorbing and releasing agent has a further advantageous effect that the water contents in gases can be controlled depending on its temperature since the amount of water retainable in the polymer can be reversibly set in accordance with its temperature.

The following modes can for example be taken in order to use the water vapor absorbing and releasing agent of this invention as devices for controlling the humidity in green houses:

(a) to hold the polymer in a container having air passage holes, while still in a pellet-like or powdery form;

(b) to mold the polymer into filaments or ropes;

(c) to form the polymer into split sheets and if desired, to bundle the split sheets;

(d) to combine the humidity-controlling devices (a)–(c) with air blowers; and (e) to bring heaters into contact with the thermosensitive polymers in the humidity-controlling devices (a)–(c) as needed, so that the humidity is controlled by temperatures.

The following modes may for example be taken in order to use the water vapor absorbing and releasing agent of this invention as humidity-controlling sheets in green houses:

(a) to form the polymer as is or as a blend with another resin into sheets;

(b) to form the polymer into tapes or slit yarns, followed by their weaving into woven fabric;

(c) to form the polymer into non-woven fabric; and (d) to form woven or non-woven fabric with another base material and then to impregnate or laminate the woven or non-woven fabric with the above-mentioned thermosensitive polymer.

By placing the above-described humidity-controlling devices and/or humidity-controlling sheets in a green house, it is possible to control the humidity in the green house suitably by allowing the humidity-controlling devices and/or humidity-sheets to absorb moisture in the air of the green house at night and then to release the thus-absorbed moisture in the daytime, whereby to suppress the occurrence of disease injury on various economic plants raised in the green house.

The water vapor absorbing and releasing agent of this invention is also suitable for the prevention of fogging or clouding. Development of cloud or fog on the surfaces of glass are in most instances caused as a result of contact between the cold surfaces and warm air or the like. It is therefore the hygroscopic capacity at low temperatures that is required for anti-fogging agents. The agents of this invention are in fact able to meet such requirement because they can absorb more moisture or water vapor as the temperature goes down and the thus-absorbed moisture or water vapor can be released as water vapor when their temperatures are raised. It is another convenient feature of the agents of this invention that their hygroscopic capacity are always unused to their maximum extents at low temperatures and they are always ready to absorb moisture at low temperatures, since they release water—which they have held—when their temperatures are raised.

As specific application embodiments, the water vapor absorbing and releasing agent of this invention may be coated with textile pieces, paper pieces or sponge to the surfaces of transparent base materials such as glass surfaces as is where it is in the form of a solution or emulsion in water or another solvent. The water vapor absorbing and releasing agent of this invention may also be sprayed by forming it into an aerosol with a propellant such as liquefied petroleum gas, fluorohydrocarbon, isobutane or dimethyl ether or by using a container equipped with a sprayer. If necessary, the thus-coated agent can be subjected to a heat treatment at 60°–250° C. for the evaporation and removal of the solvent and also for its insolubilization.

When polymerizing the monomer on the surface of a base material, the polymerization may be achieved by allowing the monomer to be present on the surface, for example, by dipping the surface of the base material in the monomer or causing the vapor of the monomer to condense on the surface in vacuo, and then polymerizing the monomer, for example, by exposing it to light such as ultraviolet ray or to γ-ray or by subjecting it to a heat treatment. Here, the monomer may contain a polymerization initiator in a form dissolved therein. The resultant polymer may be effectively insolubilized by effecting its subsequent heat treatment at 60°-250° C. or preferably, 80°-200° C. The thickness of the absorbing and releasing agent of this invention on the surface of the base material may range from several micrometers to several millimeters. Its thickness can be controlled by adjusting the amount and concentration of its coating formulation.

Along with the absorbing and releasing agent of this invention, it is also feasible to use additives such as a variety of surfactants, perfumes, rust preventives, colorants, odor preventives, antiseptics, abrasives, builders and the like.

As described above, as anti-fogging agents, (1) the hygroscopic capacity of the absorbing and releasing agents of this invention are always unused to their maximum extends at low temperatures and are thus always ready to absorb water at low temperatures because they have greater hygroscopic capacity as their temperatures go down and they release water when heated. (2) The anti-fogging agents can be applied for anti-fogging treatment and processing in various ways since they can be dissolved in various solvents and a variety of insolubilization methods can be used therefor. (3) the anti-fogging agents have such advantageous effects that they have excellent adherence to transparent base materials such as glass.

The water vapor absorbing and releasing agents of this invention are also suitable as humidity and dew sensors. Humidity increases or moisture condensation are caused in most instances by temperature drops in the environment. Thus, high hygroscopic capacity at relatively low temperatures are required for sensors. On the other hand, humidity decreases or disappearance of dew are in many instances brought about owing to entry of dry air or temperature increases in the environment. As properties required for humidity and/or dew sensors, may hence be mentioned (1) high hygroscopic capacity at low temperatures, (2) low hygroscopic capacity at high temperatures, and (3) changes in hygroscopic capacity associated with the humidity of the environment. The water vapor absorbing and releasing agents of this invention are indeed equipped with such properties.

The manner of actual and specific use of the water vapor absorbing and releasing agents of this invention as humidity and/or dew sensors may be determined by making use of property changes which will take place when the absorbing and releasing agents of this invention have absorbed moisture or water vapor therein. Changes may take place for example in weight, volume, specific heat, refractive index, electrical conductivity, dielectric constant, harness and so on. Among such properties, variations in electrical conductivity are convenient because their measurement means is simple, they may be measured accurately, and they may be measured in various ways. Specifically speaking, such changes may be measured by detecting changes in surface resistance, volume resistance, current value or the like. In order to enlarge the range of such changes to facilitate their detection, an electrolyte may also be added. No limitation is imposed on such an electrolyte so long as it dissociates into ions. It may be an organic electrolyte or an inorganic electrolyte. As specific electrolytes, may be mentioned, as organic electrolyte, sulfonates such as sodium p-toluenesulfonate, carboxylates such as sodium acetate, tertiary ammonium salts such as tetramethylammonium chloride, etc. On the other hand, any water-soluble salts may be employed as inorganic electrolyte, including sodium chloride, sodium perchlorate, sodium sulfate and the like.

The electrolyte may be added in the following specific manner. Where the absorbing and releasing agent of this invention in the form of an aqueous solution, the electrolyte may be added to the aqueous solution and may then be coated as a uniform solution to places where sensors are to be formed. Here, the effect of the addition of the electrolyte will not be fully exhibited if the concentration of the electrolyte is too low. On the other hand, problems such as deposition will occur if the concentration of the electrolyte is too high. Therefore, its concentration may generally range from 0.05-5 N. Where absorbing and releasing agents of this invention are water-soluble, they may be employed as sensors usually in the above-described manner. Even in the case of water vapor absorbing and releasing agents of this invention which are composed of water-insolubilized polymers, the electrolyte may still be combined together provided that in the case of copolymers with cross-linkable monomers, the electrolyte is concurrently allowed to exist in a dissolved form upon their copolymerization or the electrolyte is absorbed as a solution upon absorption of an aqueous solution in the polymers by dissolving the electrolyte in the aqueous solution in advance. When polymers are converted into solutions and are then insolubilized by such a method as heating, it is only necessary to add the electrolyte in the solutions in advance. When a polymer forms a composite material together with a carboxyl-containing compound or the like, the polymer may be insolubilized and integrated by adding the carboxyl-containing compound as its ammonium salt together with the electrolyte and after coating of the resultant formation, by treating it with an acid.

When a sensor is prepared using the above-described agent, the agent is placed between electric conductors while paying attention to changes for example in electrical conductivity, whereby to detect changes in the surface resistance or volume resistance of the agent or in current flowing through the agent which changes take place due to humidity variations or condensation of moisture. More specifically, where the above agent is coated on fibers, non-woven fabric or the like, the sensor may be used to detect variations in the surface resistance. Where the above agent is applied on an etched surface of a copper-plated laminate, the sensor may be used to detect changes in the resistance or current value. Sensors of various types including those formed by coating agents of this invention on film surfaces may be used.

These humidity and/or dew sensors may be used very widely. Of their application fields, they are effective for the detection of high humidity and moisture condensation especially in green houses and vinyl plastic hothouses, which are accompanied by problems due to high humidity and moisture condensation, in offices where electronic equipment susceptible to malfunction under high humidity such as computers are installed, and also in general housing.

When used as humidity and/or dew sensors, the water vapor absorbing and releasing agents of this invention (1) are fully equipped with such characteristic properties required for sensors that they absorb moisture or water vapor at low temperatures and release it at high temperatures and (2) they are polymers and may thus be processed into various shapes, and (3) they can also exhibit such an advantageous effect that they can be firmly adhered to various base materials as they have good compatibility with materials of different types.

Certain Examples of this invention will hereinafter be given. However, it should not be interpreted that the present invention is limited only to the following Examples.

EXAMPLE 1

Dissolved in 1,170 g of water were 507.5 g of N-acryloylpyrrolidine and 2.6 g of N,N'-methylenebisacrylamide to prepare an aqueous N-acryloylpyrrolidine solution containing 0.5 wt. % of N,N'-methylenebisacrylamide. After cooling the aqueous solution to 10° C., the thus-cooled solution was transferred to a 2-liter Dewar vessel made of stainless steel. Nitrogen gas was then bubbled at a flow rate of 1 liter/min. for 1 hour in the aqueous solution, using a ball filter, followed by simultaneous addition of a solution containing 2.55 g of ammonium persulfate dissolved in 10 g of water and another solution containing 1.16 g of sodium hydrogensulfite dissolved in 10 g of water to the aqueous solution. The resultant aqueous solution was then subjected to adiabatic polymerization. The resultant gel was chopped into small pieces and dried, followed by further grinding of the thus-dried product. Fractions of 20–100 mesh were collected as a sample. Ten grams of the sample powder were spread over a 200-mesh stainless steel net and were then allowed to stand in an air-conditioned chamber of 10° C. and 98% R.H. The sample powder was found to have absorbed 0.6 g of moisture per gram upon an elapsed time of 10 hours. The resultant moisture-absorbed gel was then allowed to stand in an air-conditioned chamber controlled at 40° C. and 40% R.H. One hour later, the water content of the sample powder was found to be 0.09 per gram of the sample powder. This meant that the sample powder had released 0.51 g of water per gram of the same.

EXAMPLE 2

Fifty grams of a swollen gel, which had been prepared by causing the sample powder obtained in Example 1 to absorb water in water of 10° C. (the amount of the sample powder: 3 g; the water content per gram of the sample powder: 15.7 g), were allowed to stand in an air-conditioned chamber controlled at 40° C. and 40% R.H. Two hours later, the water content was lowered to 0.10 g per gram of the sample powder. This meant that 15.6 g of water had been released per gram of the sample powder.

EXAMPLE 3

Sample powder was obtained in the same manner as in Example 1, using a 30% aqueous N-acryloylpyrrolidine solution which contained 0.35 wt. % of methylenebisacrylamide and 30 wt. % of calcium chloride. Using 10 grams of the sample powder, the amount of absorbed moisture and that of released moisture were measured in the same manner as in Example 1. The amount of absorbed moisture was 1.55 g per gram of the sample powder upon an elapsed time of 10 hours while the amount of released moisture was 1.30 g per gram of the sample powder upon an elapsed time of 2.5 hours.

EXAMPLE 4

Sample powder was obtained in the same manner as in Example 1, using a 30% aqueous N-acryloylpyrrolidine solution which contained 0.25 wt. % of methylenebisacrylamide and 50 wt. % of calcium chloride. Using 10 grams of the sample powder, the amount of absorbed moisture and that of released moisture were measured in the same manner as in Example 1. The amount of absorbed moisture was 0.79 g, 1.13 g, 1.34 g, 1.46 g and 2.10 g respectively upon elapsed times of 1 hour, 2 hours, 3 hours, 4 hours and 10 hours, each per gram of the sample powder while the amount of released moisture was 0.75 g, 1.17 g, 1.41 g, 1.54 g and 1.61 g respectively upon elapsed time of 0.5 hour, 1 hour, 1.5 hours and 2 hours, each per gram of the sample powder.

EXAMPLE 5

Sample powder was obtained in the same manner as in Example 1, using a 30% aqueous calcium chloride solution which contained 0.15 wt. % of methylenebisacrylamide and 29.85 wt. % of N-acryloylpyrrolidine. Using 10 grams of the sample powder, the amount of absorbed moisture and that of released moisture were measured in the same manner as in Example 1. The amount of absorbed moisture was 3.01 g per gram of the sample powder upon an elapsed time of 10 hours while the amount of released moisture was 2.36 g per gram of the sample powder upon an elapsed time of 4 hours.

EXAMPLE 6

Sample powder was obtained in the same manner as in Example 1, using a 30% aqueous calcium chloride solution which contained 0.05 wt. % of methylenebisacrylamide and 9.95 wt. % of N-acryloylpyrrolidine. Using 10 grams of the sample powder, the amount of absorbed moisture and that of released moisture were measured in the same manner as in Example 1. The amount of absorbed moisture was 3.60 g per gram of the sample powder upon an elapsed time of 10 hours while the amount of released moisute was 2.41 g per gram of the sample powder upon an elapsed time of 4.5 hours.

COMPARATIVE EXAMPLE 1

Ten grams of calcium chloride were weighed on a petri dish, and the amount of absorbed moisture and that of released moisture were measured in the same manner as in Example 1. The amount of absorbed moisture was 2.58 g per gram of calcium chloride upon an elapsed time of 10 hours. When moisture was absorbed to the above-mentioned amount, calcium chloride had already been in the form of an aqueous solution. On the other hand, the amount of released moisture was 0.43 g upon an elapsed time of 4 hours.

COMPARATIVE EXAMPLE 2

The amount of absorbed moisture and that of released moisture were measured in the same manner as in Example 1, using 10 g of powder which had been obtained by binding polyvinyl alcohol, which contained 30 wt. % of calcium chloride, with an adhesive and then grinding the thus bound polyvinyl alcohol. The amount of absorbed moisture was 1.20 g per gram of the sample powder upon an elapsed time of 10 hours while the amount of released moisture was 0.10 g per gram of the sample powder upon an elapsed time of 10 hours. Thus, the majority of absorbed moisture was kept in the sample powder.

EXAMPLE 7

Sample powder was obtained in the same manner as in Example 1, using a 30% aqueous N-acryloylpyrrolidine solution which contained 0.5 wt. % of methylenebisacrylamide and 4.98 wt. % of calcium 2-acrylamido-2-methylpropanesulfonate. Using 10 grams of the sample powder, the amount of absorbed moisture and that of released moisture were measured in the same manner as in Example 1. The amount of absorbed moisture was 0.70 g per gram of the sample powder upon an elapsed time of 10 hours while the amount of released moisture was 0.56 g per gram of the sample powder upon an elapsed time of 1.5 hours.

EXAMPLE 8

Sample powder was obtained in the same manner as in Example 1, using a 30% N-acryloylpyrrolidine solution which contained 0.022 wt. % of methylenebisacrylamide, 43.5 wt. % of calcium chloride and 0.13 wt. % of nylon fibers (lengths: 1 mm). Using 10 grams of the sample powder, the amount of absorbed moisture and that of released moisture were measured in the same manner as in Example 1. The amount of absorbed moisture was 0.57 g, 0.92 g and 2.88 g, each per gram of the sample powder, respectively upon elapsed times of 1 hour, 2 hours and 10 hours while the amount of released moisture was 1.35 g, 1.81 g, 2.37 g and 2.67 g, each per gram of the sample powder, respectively upon elapsed times of 0.5 hour, 1 hour, 2 hours and 3.5 hours.

EXAMPLE 9

Dissolved in 1,170 g of water were 507.5 g of N-propylacrylamide and 2.6 g of N,N'-methylenebisacrylamide to prepare an aqueous N-propylacrylamide solution containing 0.5 wt. % of N,N'-methylenebisacrylamide. After cooling the aqueous solution to 10° C., the thus-cooled solution was transferred to a 2-liter Dewar vessel made of stainless steel. Nitrogen gas was then bubbled at a flow rate of 1 liter/min. for 1 hour in the aqueous solution, using a ball filter, followed by simultaneous addition of a solution containing 2.55 g of ammonium persulfate dissolved in 10 g of water and another solution containing 1.16 g of sodium hydrogensulfite dissolved in 10 g of water to the aqueous solution. The resultant aqueous solution was then subjected to adiabatic polymerization. The resultant gel was chopped into small pieces and dried, followed by further grinding of the thus-dried product. Fractions of 20–100 mesh were collected as a sample. Then, 0.5 g of the sample powder was placed in a plastic bag containing air of 30° C. and 67% R.H. and having an internal volume of 500 ml. After allowing the sample powder to remain in the plastic bag for 20 minutes, the relative humidity of the air in the plastic bag was lowered to 34%. When this bag was then brought into contact with the surface of ice water to cool the same, the relative humidity was lowered down to 22%. At that time, the temperature was 16° C. in the plastic bag. When this plastic bag was allowed to stand at room temperature, the relative humidity in the plastic bag increased to 32%.

EXAMPLE 10

Ten grams of a water-holding gel (water content: 9.4 g), which had been obtained by causing the sample powder obtained in Example 9 to swell at 10° C. in distilled water, were placed in a plastic bag having an internal volume of 500 ml and the plastic bag was hermetically sealed. The relative humidity was measured while changing the temperature. As a result, the relative humidity was found to be 87% at 30° C., 37% at 25° C., 87% again at 30° C. and 98% at 40° C.

EXAMPLE 11

Sample powder was obtained in the same manner as in Example 9, using a 30% aqueous N-acryloylpyrrolidine solution which contained 0.5 wt. % of N,N'-methylenebisacrylamide. Using a home hothouse covered with a vinyl plastic equipped with a device, which was able to forceably circulate air through a temperature-controllable packed tube containing 8.5 g of the sample powder packed therein, and having an internal volume of 195 liters, the relative humidity in the hothouse was measured. While the air in the hothouse was not forcedly circulated, the temperature and humidity were respectively 26.5° C. and 72% in the hothouse. When the packed tube was cooled to 10° C. and the air in the hothouse was forcedly circulated at a circulation rate of 9.5 liters/min. through the packed tube, the relative humidity in the hothouse dropped to 30% although the temperature in the hothouse remained unchanged at 26.5° C. When the packed tube was then heated to 50° C. the temperature and relative humidity in the hothouse were 27° C. and 64%, respectively.

EXAMPLE 12

Using the same hothouse as that employed in Example 11, 1.5 kg of wet soil was placed in the hothouse and the relative humidity in the hothouse was measured in the same manner as in Example 11. When the temperature of the packed tube was controlled at 20° C., the temperature and relative humidity in the hothouse were 25.5° C. and 75% respectively. When the packed tube was thereafter cooled to 10° C., the temperature and relative humidity in the hothouse were lowered to 25° C. and 63% respectively. The packed tube was then heated to 50° C. The temperature and relative humidity in the hothouse were 25.5° C. and 93% respectively. During the above measurements, the soil placed in the hothouse remained in a wet state.

EXAMPLE 13

The apparatus used in Example 12 was placed in its entirety in a constant-temperature chamber. Changes of the relative humidity in the hothouse were measured while varying the external temperature. In this Example, the temperature of the packed tube was not controlled but allowed to follow the external temperature. When the external temperature was 33° C., the temperature and relative humidity in the hothouse were 33° C. and 57% respectively. The external temperature was then cooled to 15° C. The temperature in the hothouse dropped to 15.5° C. while the relative humidity in the hothouse jumped to 92%. During the above measurements, the soil placed in the hothouse remained in a wet state and no phenomenon of moisture condensation was observed on the walls of the hothouse and the like.

COMPARATIVE EXAMPLE 3

Variations of the relative humidity in a hothouse were measured in the same manner as in Example 13 except for the removal of the packed tube from the apparatus employed in Example 12. When the external temperature was 34° C., the temperature and relative humidity in the hothouse were 33.5° C. and 69% respectively. Thereafter, the external temperature was lowered little by little. Dew started to occur on the inner walls of the hothouse when the external temperature was 20° C. At this stage, the temperature and relative humidity in the hothouse were 24° C. and 76% respectively. The external temperature was lowered further. When it reached 16° C., the temperature and relative humidity in the hothouse reached 16.5° C. and 99% respectively. Dew was formed on the entire inner walls of the hothouse. The thus-condensed moisture was running down along the inner walls of the hothouse.

EXAMPLE 14

Using a 30% aqueous solution of N-acryloylpyrrolidone, polymerization was conducted in the same manner as in Example 1. The resultant polymer was dissolved in methanol and non-woven fabric (50 cm×60 cm; 9.7 g) made of a polyester was immersed in the methanol solution. Thereafter, the non-woven fabric was dried in vacuo. The N-acryloylpyrrolidine polymer was impregnated to 5.4 g in the non-woven fabric. Then, the packed tube was removed from the apparatus of Example 12 and the polyester-made non-woven fabric impregnated with N-acryloylpyrrolidine was hung in the hothouse. In the same manner as in Example 13, variations of the relative humidity in the hothouse were measured. When the external temperature was 22° C., the temperature in the hothouse was also 22° C. while the relative humidity in the hothouse was 89%. When the external temperature was raised to 36° C., the temperature in the hothouse increased to 35.5° C. while the relative humidity in the hothouse raised to 58%. When the external temperature was decreased to 15° C., the temperature in the hothouse was decreased to 15.5° C. while the relative humidity was 95%. During the above measurements, the placed soil remain in a wet state and no phenomenon of moisture condensation was observed on the inner walls, etc. of the hothouse.

EXAMPLE 15

Sample powder was obtained in the same manner as in Example 1, using a 30% aqueous N-isopropylacrylamide which contained 0.5 wt. % of N,N'-methylenebisacrylamide. The sample powder was caused to swell at 10° C. in distilled water to obtain a water-holding gel. Ten grams (water content: 9.6 g) of the water-holding gel were placed in a plastic bag having an internal volume of 500 ml. The plastic bag was thereafter hermetically sealed. The relative humidity was measured while changing the temperature. As a result, the relative humidity was found to be 85% at 30° C., 33% at 20° C., 86% again at 30° C., and 95% at 50° C.

EXAMPLE 16

A 30% N,N-diethylacrylamide solution in N,N-dimethylformamide, which solution contained 0.5 wt. % of N,N'-methylenebisacrylamide, was transferred to a Dewar vessel. After purging the solution with nitrogen, 1.5% of azobisisobutylonitrile was added to the solution and the resulting solution was subjected to adiabatic polymerization. The resultant gel was chopped into small pieces and dried at 120° C. Thereafter, it was ground further. Fractions of 20–100 mesh were collected as a sample. The sample powder was caused to swell at 10° C. in distilled water to obtain a water-holding gel. Ten grams (water content: 8.0 g) of the water-holding gel were placed in a plastic bag having an internal volume of 500 ml. The plastic bag was hermetically sealed. The relative humidity was measured while varying the temperature. As a result, the relative temperature was found to be 76% at 30° C., 41% at 20° C., 75% again at 30° C., and 82% at 50° C.

EXAMPLE 17

Sample powder was obtained in the same manner as in Example 1, using a 30% aqueous N-acryloylmorpholine which contained 0.5 wt. % of N,N'-methylenebisacrylamide. The sample powder was caused to swell at 10° in distilled water to obtain a water-holding gel. Ten grams (water content: 9.3 g) of the water-holding gel were placed in a plastic bag having an internal volume of 500 ml. The plastic bag was thereafter hermetically sealed. The relative humidity was measured while changing the temperature. As a result, the relative humidity was found to be 86% at 30° C., 35% at 20° C., 87% again at 30° C., and 94% at 50° C.

EXAMPLE 18

Under a nitrogen gas stream, the following materials were charged with stirring in the following proportions to a reaction vessel:

| | parts by weight |
|---|---|
| Distilled water | 47.5 |
| N—n-Propylacrylamide | 1.25 |
| 2-Hydroxyethyl methacrylate | 1.25 |

Thereafter, the following materials were also added to the resultant mixture:

| | parts by weight |
|---|---|
| Ammonium persulfate | 0.25 |
| Sodium hydrogensulfite | 0.11 |

The thus-obtained mixture was subjected to polymerization at 10°–30° C. for 6 hours.

Since the transition temperature from a state in which hygroscopic capacity is retained to another state in which absorbed water is released can be observed as a turbidity-starting temperature of the water-holding polymer, the transition temperature of the polymer obtained in the present Example was measured in the following manner.

Namely, an aqueous solution of the above polymer was placed in a testing tube having an internal diameter of 15 mm. A standard thermometer was inserted in the testing tube and the solution was gradually heated in temperature-controlled water while stirring it with the thermometer. Turbidity was started at 22° C. and at 23° C., the solution wsa clouded to such a degree that the mercury bulb of the thermometer was no longer visible. The aqueous solution remained in a stable and clouded state when it was heated further. On the other hand, when the aqueous solution was cooled, the aqueous solution became clear below the clouding point.

The polymer was dried and pelletized. The pellets were thereafter packed over a length of about 10 cm in a cylindrical vessel having a diameter of 50 cm, using two wire nets of about 10 mesh as partition walls. A small fan was provided with the cylindrical vessel, whereby to permit passage of air through the cylindrical vessel from one end thereof. The resultant device was provided as a humidity-controlling device for vinyl plastic hothouses.

Using the humidity-controlling device, a cropraising test and an investigation on the interior relative humidity were carried out in a hothouse covered with a vinyl plastic of 90 $m^2$ wide located in a suburb of Nagoya-shi.

Commercial "Mutsui Vinyl Superlight 0.10 mm" (hereinafter referred to as "Film No. 1") and "Mitsui Vinyl Transparent Droplet-Running Lining 0.05 mm" (referred to as "Film No. 2"), both produced by Mitsui-Toatsu Chemicals Incorporated, were used as an outer film and a lining respectively. They were arranged to form a fully double covering. The above-mentioned humidity-controlling device was disposed approximately in the middle of the resultant hothouse.

Cucumber (variety: "Okin for forcing culture") was chosen as an economic plant. It was seeded on September 18 and planted on October 8. Cucumbers were harvested from the beginning of November to the middle of March. Under conditions of 180 cm row width, 40 cm intrarow spacing, planting in two rows and the following amounts of applied fertilizers: N-1.7 kg/a, $P_2O_5$- 1.6 kg/a and $K_2O$-1.6 kg/a, the daytime temperature and night temperature were controlled respectively at 23°-28° C. and 10°-15° C. by means of a heater. On the other hand, the spraying of chemicals after the planting of the seedlings was effected by applying DDVP, Morestan and Bisdithane approximately twice a month.

The cucumber plants raised in the above manner were free from development of disease injury and gave a sufficient yield. Results are shown in Table 1. Despite of the substantially-closed state, the relative humidity in the hothouse was held on the order of 80% in the daytime and on the order of 80–90% even at night.

COMPARATIVE EXAMPLE 4

A hothouse covered with a vinyl plastic was assembled as a control lot in exactly the same manner as in Example 18 except that the humidity-controlling device of this invention was not used. In the hothouse, the humidity reached 100% at night. As readily envisaged from the results given in Table 1, Sclerotinia rot occurred to a considerable extent and the yield was reduced by about 35%.

TABLE 1

| | Percent of infected plants | Percent of infected cucumbers | Yield* |
|---|---|---|---|
| Example 18 | 0 | 0 | 100 |
| Comp. Ex. 4 | 28% | 16% | 66 |

*Yield was expressed in terms of weight index based on the yield of Example 18 which is supposed to be 100.

As apparent from the above-given results, occurrence of disease injury on the economic plant was little and the yield was hence increased in the hothouse equipped with the humidity-controlling device of this invention, because the economic plant was kept in a suitable environment, i.e., under humidity on the order of 80–90%.

EXAMPLE 19

Under a nitrogen gas stream, the following materials were charged with stirring in the following proportions to a reaction vessel:

| | parts by weight |
|---|---|
| Distilled water | 45 |
| N—Acryloylpyrrolidine | 1.25 |
| N—Acryloylpiperidine | 1.25 |

Thereafter, the following materials were also added to the resultant mixture:

| | parts by weight |
|---|---|
| Ammonium persulfate | 0.25 |
| Sodium hydrogensulfite | 0.115 |

The thus-obtained mixture was subjected to polymerization at 15°-30° C. for 6 hours.

Since the transition temperature from a state in which hygroscopic capacity is retained to another state in which absorbed water is released can be observed as a turbidity-starting temperature of the water-holding polymer, the transition temperature of the polymer obtained in the present Example was measured in the same manner as in Example 18.

Turbidity was started at 23° C. and at 24° C. The aqueous solution remained in a stable and clouded state when it was heated further. On the other hand, when the aqueous solution was cooled, the aqueous solution became clear below the clouding point.

The polymer was dried and pelletized. Using a T-die extruder, the pellets were thereafter molded at a melt-molding temperature of 240° C. into a sheet having a thickness of 50 μm. The sheet was brought into a contiguous relation with spun-bonded non-woven polyester fabric (fineness: 5 denier; basis weight: 50 g/$m^2$). They were passed through rolls which were heated at 150° C., whereby bonding them together into a laminated moisture-controlling agricultural sheet.

Using the humidity-controlling sheet as a lining for a hothouse covered with a vinyl plastic, a crop-raising test and an investigation on the interior relative humidity were carried out. The humidity-controlling sheet was used in the following manner. On a 33 $m^2$ vinyl plastic hothouse located in a suburb of Nagoya-shi, "Film No. 1" and "Film No. 2" were used as an outer film and a ceiling lining, respectively. The above humidity-controlling sheet was arranged to cover the entire side walls.

Cucumber plants (variety: "Okin for forcing culture") were raised in the same manner as in Example 18. The cucumber plants raised were free from development of disease injury and gave a sufficient yield. Results are shown in Table 2. Despite of the substantially-closed state, the relative humidity in the hothouse was held on the order of 80% in the daytime and on the order of 80–90% even at night.

COMPARATIVE EXAMPLE 5

A hothouse covered with a vinyl plastic was assembled as a control lot in exactly the same manner as in Example 19 except that commercial PVA-base "Hope Sheet" produced by Mitsui Petrochemical Industries, Ltd. was used as hygroscopic non-woven fabric in place of the humidity-controlling sheet. In the hothouse, the humidity reached 100% at night. As readily envisaged from the results given in Table 2, Sclerotinia rot occurred to a considerable extent and the yield was reduced by about 30%.

COMPARATIVE EXAMPLE 6

A hothouse covered with a vinyl plastic was assembled as a control lot in exactly the same manner as in Example 19 except that the humidity-controlling sheet was not used on the side walls of the hothouse but "Film No. 2", which was the same one as that used for the ceiling, was used on the side walls. In the hothouse, the humidity reached 100% at night. As readily envisaged from the results given in Table 2, Sclerotinia rot occurred to a still higher extent and the yield was reduced by about 40%.

TABLE 2

| | Percent of infected plants | Percent of infected cucumbers | Yield* |
|---|---|---|---|
| Example 19 | 0 | 0 | 100 |
| Comp. Ex. 5 | 22% | 13% | 72 |
| Comp. Ex. 6 | 32% | 19% | 61 |

EXAMPLE 20

After dissolving 75 g of N-acryloylpyrrolidine in 655 g of distilled water and cooling the resultant solution to 10° C., the thus-cooled solution was transferred to a 1-liter Dewar vessel made of stainless steel. Using a ball filter, nitrogen gas was caused to bubble for 45 minutes at a flow rate of 0.5 liter/min. Thereafter, a solution containing 0.4 g of ammonium persulfate dissolved in 10 g of distilled water and another solution containing 0.17 g of sodium hydrogensulfite dissolved in 10 g of distilled water were added simultaneously to the above solution. The resultant aqueous solution was subjected to adiabatic polymerization to obtain a 10% aqueous polymer solution of N-acryloylpyrrolidine. A glass plate the surfaces of which had been thoroughly degreased and cleaned was immersed in the aqueous polymer solution. The glass plate was then pulled out of the aqueous polymer solution, followed by its drying in vacuo at 60° C. Then, it was subjected to a heat treatment at 125° C. overnight. After the heat treatment, the surfaces of the glass plate remained transparent. Even when the glass plate was brought into contact with steam, its surfaces did not develop fogging but were turned into a uniformly wet state and remained transparent. This phenomenon was not changed even after alternate repetition of the wet state and dry state 5 times.

COMPARATIVE EXAMPLE 7

A glass plate the surfaces of which had been thoroughly degrease and cleaned was brought into contact with steam. Minute water droplets deposited on the surfaces of the glass plate, whereby developing fogging on the surfaces of the glass plate.

EXAMPLES 21–40

In the same manner as that employed in Example 20, 10% aqueous polymer solutions of polymers or copolymers the compositions of which are shown in Table 3 were obtained. Using those aqueous polymer solutions, glass plates coated with the copolymers and then subjected to heat treatments were obtained in the same manner as in Example 20. The transparency of the glass plates as well as the degrees of fogging and transparency of the surfaces of the glass plates when exposed to steam were evaluated. Results are summarized in Table 3.

TABLE 3

| Example | Composition of copolymer* (wt. % in brackets) | Transparency | Upon exposure to steam: Anti-fogging property | Upon exposure to steam: Transparency |
|---|---|---|---|---|
| 21 | N—EtAAM(100) | O | O | O |
| 22 | N—AcPy(100) | O | O | O |
| 23 | N—AcPy(87.5)/N—PrAAM(12.5) | O | O | O |
| 24 | N—AcPy(75)/N—PrAAM(25) | O | O | O |
| 25 | N—AcPy(62.5)/N—PrAAM(37.5) | O | O | O |
| 26 | N—AcPy(50)/N—PrAAM(50) | O | O | O |
| 27 | N—AcPy(37.5)/N—PrAAM(62.5) | O | O | O |
| 28 | N—AcPy(85)/N—BuAAM(15) | O | O | O |
| 29 | N—AcPy(73)/N—BuAAM(27) | O | O | O |
| 30 | N—AcPy(75)/N—AcPi(25) | O | O | O |
| 31 | N—AcPi(58.4)/AAM(41.6) | O | O | O |
| 32 | N—AcPi(50)/AAM(50) | O | O | O |
| 33 | N—AcPi(25)/AAM(75) | O | O | O |
| 34 | N—AcPi(50)/N—EtAAM(50) | O | O | O |
| 35 | N—AcPi(25)/N—EtAAM(75) | O | O | O |
| 36 | N—AcPi(75)/N,N—DMeAAM(25) | O | O | O |
| 37 | N—AcPi(50)/N,N—DMeAAM(50) | O | O | O |
| 38 | N—AcPi(41.7)/N,N—DMeAAM(58.3) | O | O | O |
| 39 | N—AcPi(33.4)/N,N—DMeAAM(66.6) | O | O | O |
| 40 | N—AcPi(25)/N,N—DMeAAM(75) | O | O | O |

Transparency:
O: transparent,
Δ: Slightly clouded,
X: clouded in white.
Anti-fogging property:
O: Surfaces wet uniformly and free of cloud,
Δ: Deposited in the form of large water droplets,
X: deposited in the form of minute water droplets.
*N—EtAAM: N—ethylacrylamide,
N—AcPy: N—acryloylpyrrolidine,
N—PrAAM: N—n-propylacrylamide,
N—BuAAM: N—n-butylacrylamide,
N—AcPi: N—acryloylpiperidine.

EXAMPLE 41

A homogeneous aqueous solution was prepared by adding 6 ml of a 1% aqueous polymer solution of ammonium acrylate to 14 ml of a 1% aqueous polymer solution of N-acryloylpyrrolidine, followed by a further addition of 2 ml of a 1N aqueous HCl solution. Simultaneously with the addition, the formation of a composite material was observed at the interface between the homogeneous aqueous solution and the aqueous HCl solution. The composite material was separated in the form of a white film. After washing the composite material with distilled water, it was dried and ground into powder. Using a 10% N,N-dimethylformamide solution of the powder, a glass plate treated with the composite material in the same manner as in Example 20 was obtained. The surfaces of the glass plate were transparent. When brought into contact with steam, the surfaces of the glass plate were turned into a uniformly wet state. They did not develop fogging and remained transparent.

EXAMPLE 42

In the same manner as in Example 41, a composite material was obtained using a 1% aqueous solution of N-n-propylacrylamide. Using the composite material, a glass plate treated with the composite material was obtained in the same manner as in Example 41. The surfaces of the glass plate were transparent. When exposed to steam, the surfaces of the glass plate were turned to a uniformly wet state. They were not clouded but remained transparent.

EXAMPLE 43

Added to and dissolved in 100 ml of N,N-dimethylformamide were 9 g of N-acryloylpyrrolidine, 1 g of acrylonitrile and 0.164 g of azobisisobutyrnitrile. After purging the interior of the reactor with nitrogen gas, the contents were polymerized at 50° C. for 3 hours. After the polymerization, the polymer solution was poured into ethyl ether so as to allow the resultant polymer to deposit. It was then collected by filtration and dried, thereby obtaining a copolymer having the N-acrylopyrrolidine/acrylonitrile proportions of 90:10. Using a 10% aqueous solution of the copolymer, a glass plate treated with the copolymer was obtained in the same manner as in Example 20. The surfaces of the glass plate were transparent. When exposed to steam, the surfaces of the glass plate were turned to a uniformly wet state. They were not clouded but remained transparent.

EXAMPLE 44

A 10% aqueous polymer solution of N-n-propylacrylamide was obtained in exactly the same manner as in Example 20 except that N-n-propylacrylamide was used in place of N-acryloylpyrrolidine. Using the polymer solution, a glass plate treated with the polymer and then subjected to a heat treatment was obtained in the same manner as in Example 20. After the heat treatment, the surfaces of the glass plate remained transparent. When exposed to steam, the surfaces of the glass plate were not clouded but were turned to a uniformly wet state and remained transparent.

EXAMPLE 45

A 10% aqueous polymer solution of N-isopropylacrylamide was obtained in exactly the same manner as in Example 20 except that N-isopropylacrylamide was used in place of N-acryloylpyrrolidine. Using the polymer solution, a glass plate treated with the polymer and then subjected to a heat treatment was obtained in the same manner as in Example 20. After the heat treatment, the surfaces of the glass plate remained transparent. When exposed to steam, the surfaces of the glass plate were not clouded but were turned to a uniformly wet state and remained transparent.

EXAMPLE 46

A 10% N,N-dimethylformamide solution of N,N-diethylacrylamide was transferred to a Dewar vessel. After purging the solution with nitrogen, azobisisobutyronitrile was added at 30° C. to 1.5%. The mixture was subjected to adiabatic polymerization, thereby obtaining a 10% polymer solution of N,N-diethylacrylamide. Using the polymer solution, a glass plate treated with the polymer and then subjected to a heat treatment was obtained in the same manner as in Example 20. After the heat treatment, the surfaces of the glass plate remained transparent. When exposed to steam, the surfaces of the glass plate were not clouded but were turned to a uniformly wet state and remained transparent.

EXAMPLE 47

A 10% aqueous polymer solution of N-acryloylmorpholine was obtained in exactly the same manner as in Example 20 except that N-acryloylmorpholine was used in place of N-acryloylpyrrolidine. Using the polymer solution, a glass plate treated with the polymer and then subjected to a heat treatment was obtained in the same manner as in Example 20. After the heat treatment, the surfaces of the glass plate remained transparent. When exposed to steam, the surfaces of the glass plate were not clouded but were turned to a uniformly wet state and remained transparent.

EXAMPLES 48–59

Using the 10% aqueous polymer solution of N-acryloylpyrrolidine, which had been obtained in Example 20, and additives shown in Table 4, aqueous polymer solutions having compositions given in Table 4 were obtained. Using the polymer solutions, glass plates treated with the polymers and then subjected to heat treatments were obtained in the same manner as in Example 20. The transparency of the glass plates and their antifogging properties and transparency upon exposure to steam were evaluated. Results are shown in Table 4.

COMPARATIVE EXAMPLES 8–19

Using the aqueous solution shown in Table 5 which solutions did not contain poly(N-aryloylpyrrolidine) in Examples 48–59, glass plates treated with the polymers and then subjected to heat treatments were obtained in the same manner as in Example 20. The transparency of the glass plate and their antifogging properties and transparency upon exposure to steam were evaluated. Results are shown in Table 5.

TABLE 4

| Ex. | Conc. of poly(N—acryloylpyrrolidine)(wt. %) | Additive (concentration in brackets by wt. %), | Transparency | Upon exposure to steam: Anti-fogging property | Upon exposure to steam: Transparency |
|---|---|---|---|---|---|
| 48 | 5.0 | Polyethyleneglycol mono-(p-nonylphenyl)ether (4.0) | O | O | O |
| 49 | 5.0 | Emulgen 906* (4.5) | O | O | O |
| 50 | 5.0 | Emulgen 913* (4.5) | O | O | O |
| 51 | 5.0 | Emulgen 935* (4.5) | O | O | O |
| 52 | 5.0 | Emulgen 950* (4.0) | O | O | O |
| 53 | 5.0 | Emulgen 985* (4.0) | O | O | O |
| 54 | 5.0 | Isopropyl alcohol (5.0) | O | O | O |
| 55 | 5.0 | Triethanol amine (2.5) | O | O | O |
| 56 | 5.0 | Glycerin (2.0) | O | O | O |
| 57 | 5.0 | Brisurf AL** (4.0) | O | O | O |
| 58 | 5.0 | Nikkol DDP-2*** (4.0) | O | O | O |
| 59 | 5.0 | Nikkol TDP-2*** (4.0) | O | O | O |

Transparency:
O: transparent,
Δ: slightly clouded,
X: clouded in white.
Anti-fogging property:
O: Surfaces wet uniformly and free of cloud,
Δ: Deposited in the form of large water droplets,
X: deposited in the form of minute water droplets.
*Trade names: products of Kao Atlas Corporation
**Trade name: product of Daiichi Kogyo Seiyaku K.K.
***Trade names: products of Nikko Chemicals Inc.

TABLE 5

| Comp. Ex. | Additive (concentration in brackets by wt. %), | Transparency | Upon exposure to steam: Anti-fogging property | Upon exposure to steam: Transparency |
|---|---|---|---|---|
| 8 | Polyethyleneglycol mono-(p-nonylphenyl)ether (4.0) | O | Δ | O |
| 9 | Emulgen 906* (4.5) | O | X | O |
| 10 | Emulgen 913* (4.5) | O | X | O |
| 11 | Emulgen 935* (4.5) | O | X | O |
| 12 | Emulgen 950* (4.0) | O | Δ | O |
| 13 | Emulgen 985* (4.0) | O | Δ | O |
| 14 | Isopropyl alcohol (5.0) | O | X | O |
| 15 | Triethanol amine (2.5) | O | X | O |
| 16 | Glycerin (2.0) | O | X | O |
| 17 | Brisurf AL** (4.0) | O | Δ | O |
| 18 | Nikkol DDP-2*** (4.0) | O | Δ | O |
| 19 | Nikkol TDP-2*** (4.0) | O | Δ | O |

Transparency:
O: transparent,
Δ: slightly clouded,
X: clouded in white.
Anti-fogging property:
O: Surfaces wet uniformly and free of cloud,
Δ: Deposited in the form of large water droplets,
X: deposited in the form of minute water droplets.
*Trade names: products of Kao Atlas Corporation
**Trade name: product of Daiichi Kogyo Seiyaku K.K.
***Trade names: products of Nikko Chemicals Inc.

EXAMPLES 60–66

Dissolved in 580 g of distilled water was 150 g of N-acryloylpyrrolidine. After cooling the resultant solution to 10° C., it was transferred to a 1-liter Dewar vessel made of stainless steel. Then, nitrogen gas was bubbled for 45 minutes as a flow rate of 0.5 liter/min. through a ball filter. To the resultant solution, a solution containing 0.8 g of ammonium persulfate dissolved in 10 g of distilled water and another solution containing 0.34 g of sodium hydrogensulfite dissolved in 10 g of distilled water were added at the same time. The thus-prepared aqueous solution was subjected to adiabatic polymerization, thereby obtaining a 20% aqueous polymer solution of N-acryloylpyrrolidine. The aqueous polymer solution was diluted to 10% with distilled water. Then, electrolytes were respectively added to their corresponding concentrations given in Table 6. In each of the resultant aqueous solution, a non-woven polyester fabric of 4 cm×4 cm was immersed. The polyester fabric was pulled out of the aqueous solution and was then dried under vacuum. The non-woven fabric was allowed to stand for 2 hours in a desiccator the internal humidity of which had been conditioned to achieve the corresponding relative humidity shown in Table 6. Thereafter, the surface resistivity of the non-woven fabric was measured using an ultra-sensitive insulation meter (manufactured by Toa Denpa Kogyo K.K.; Model: SM-10E). Results are given in Table 6. The measurements were carried out in the following order. Namely, the surface resistivity was first measured under the lowest relative humidity. The surface resistivity of the same non-woven fabric was then successively measured by moving it from one desiccator to another. Finally, the non-woven fabric was left over again under a relative humidity of 50% for 24 hours and its surface resistivity was then measured.

TABLE 6

| Ex. | Electrolyte Name | Electrolyte Conc. (N) | Surface resistivity(Ω) 0% R.H. | 50% R.H. | 80% R.H. | 100% R.H. | 50% R.H. |
|---|---|---|---|---|---|---|---|
| 60 | Not added | | $6 \times 10^{15}$ and up | $2.0 \times 10^{8}$ | $6 \times 10^{4}$ | $7.5 \times 10^{3}$ | $8.1 \times 10^{7}$ |
| 61 | Sodium chloride | 1.0 | $3.6 \times 10^{6}$ | $1.3 \times 10^{6}$ | $4.5 \times 10^{2}$ | $1.1 \times 10^{5}$ | |
| 62 | Sodium chloride | 5.0 | $1.1 \times 10^{6}$ | $5.7 \times 10^{5}$ | $2.1 \times 10^{2}$ | 84 | $9.3 \times 10^{4}$ |
| 63 | Sodium p-toluene-sulfonate | 1.0 | $1.5 \times 10^{7}$ | $1.0 \times 10^{6}$ | $4.2 \times 10^{2}$ | $1.5 \times 10^{2}$ | $7.5 \times 10^{5}$ |
| 64 | Sodium p-toluene-sulfonate | 5.0 | $2.4 \times 10^{8}$ | $6 \times 10^{5}$ | $7.8 \times 10^{3}$ | 45 | $4.5 \times 10^{2}$ |
| 65 | Sodium perchlorate | 1.0 | $1.4 \times 10^{7}$ | $1.4 \times 10^{4}$ | 51 | 3 and down | $9.6 \times 10^{2}$ |
| 66 | Sodium perchlorate | 5.0 | $5.4 \times 10^{7}$ | 18 | 3 and down | 3 and down | 12 |

EXAMPLE 67

A copper-plated laminate of 1 cm square and 1.5 mm thick (thickness of copper layer: 30 μm) was subjected to an etching treatment to remove the central part of the copper layer with a width of 2 mm. Copper wires were respectively soldered to the copper layer portions which remained on the both sides, thereby obtaining a sample chip. To the surface of the sample chip, the 10% polymer solution of N-acryloylpyrrolidine which solution was obtained in Example 60 was coated. The thus-coated sample chip was dried at 60° C. for 4 hours. The sample chip was then placed within an inner tube of a glass-made double-walled cylinder which permitted circulation of cooling water through its outer tube. The two copper wires attached to the sample chip were connected to a circuit meter (manufactured by Sanwa Electric Meter Co., Ltd.; Model: N-401F), whereby to measure the electric resistance between the copper layer portions. It was found to be infinitely great. Then, nitrogen gas was caused to bubble at a flow rate of 250 ml/min through distilled water of 75° C. The thus-bubbled nitrogen gas was fed to the inner tube of the double-walled cylinder while water of 20° C. was passed through the outer tube. The electric resistance between the copper plate portions was found to be $3.3 \times 10^{6}\Omega$ when condensed water started depositing on the inner tube. When the inner tube was fully covered by the condensed water, it reached $9.0 \times 10^{5}\Omega$. In addition, the relative humidity of the nitrogen gas which had come out of the inner tube was measured by a digital humidity meter (manufactured by Sato Measuring Instrument Manufacturing Co., Ltd.; Model: SK-50TRH). It was 70.0% when the moisture condensation started and 74.5% when the moisture condensation completed. When dry nitrogen gas was thereafter fed for 18 minutes at a flow rate of 250 ml/min. to the inner tube, the electric resistance between both copper layer portions became infinitely great.

COMPARATIVE EXAMPLE 20

Using the sample chip which had been obtained in Example 67 by removing the copper layer at the central part thereof and soldering the copper wires respectively to the side copper layer portions, the electric resistance between the copper layer portions was measured in the same manner as in Example 67. It was infinitely great when the moisture condensation started. When the inner tube had been fully covered by condensed water, it was found to be $1 \times 10^{7}\Omega$. When the inner tube had been fully covered by condensed water, the relative humidity of the exhausted nitrogen gas was 81.4%.

EXAMPLES 68–73

To the 10% aqueous polymer solution of N-acryloylpyrrolidine which solution was obtained in Example 60, electrolytes were respectively added to achieve their corresponding concentrations shown in Table 7. Using the thus-prepared solutions, sample chips were obtained in the same manner as in Example 67. Following the procedure of Example 67, the electric resistance between the copper layer portions of each sample chip and the relative humidity of exhausted nitrogen gas were measured. Results are given in Table 7.

TABLE 7

| Ex. | Electrolyte Name | Electrolyte Conc. (N) | Electric Resistance (Ω) Before $N_2$ feeding | At the beginning of moisture condensation | Upon completion of moisture condensation | R.H. (%) of exhausted $N_2$ At the beginning of moisture condensation | Upon completion of moisture condensation | After dry $N_2$ feeding Time (min.) | Electric resistance (Ω) |
|---|---|---|---|---|---|---|---|---|---|
| 68 | Sodium chloride | 1.0 | ∞ | $1.0 \times 10^{5}$ | $7.5 \times 10^{4}$ | 70.2 | 72.9 | 23 | ∞ |
| 69 | Sodium chloride | 5.0 | ∞ | $1.5 \times 10^{5}$ | $3.0 \times 10^{4}$ | 73.4 | 79.0 | 29 | ∞ |
| 70 | Sodium p-toluene-sulfonate | 1.0 | ∞ | $1.4 \times 10^{5}$ | $3.4 \times 10^{4}$ | 74.7 | 80.9 | 21 | ∞ |
| 71 | Sodium p-toluene-sulfonate | 5.0 | ∞ | $1.5 \times 10^{5}$ | $4.0 \times 10^{4}$ | 78.6 | 80.5 | 24 | ∞ |
| 72 | Sodium perchlorate | 1.0 | ∞ | $1.3 \times 10^{5}$ | $3.0 \times 10^{4}$ | 70.0 | 76.4 | 25 | ∞ |
| 73 | Sodium perchlorate | 5.0 | ∞ | $2.2 \times 10^{4}$ | $1.0 \times 10^{4}$ | 75.0 | 77.1 | 31 | ∞ |

EXAMPLE 74

A 20% aqueous polymer solution of N-n-propylacrylamide was obtained in exactly the same manner as in Example 60 except that N-n-propylacrylamide was used in place of N-acryloylpyrrolidine. The aqueous polymer solution was diluted to 10% with distilled water, to which sodium chloride was added and dissolved in such an amount that its concentration reached 1.0N. Using the thus-prepared solution, a sample chip was obtained in the same manner as in Example 67.

Using this sample chip, the electric resistance between both copper layer portions and the relative humidity of exhausted nitrogen gas were measured in the same manner as in Example 67. The electric resistance was infinitely great prior to the feeding of the nitrogen gas. When moisture condensation had begun to occur, it was $1.2\times10^5\Omega$. When the inner tube had been fully covered by condensed water, it was $7.3\times10^4\Omega$. On the other hand, the relative humidity of the exhausted nitrogen was 71.4% at the beginning of the moisture condensation and 73.0% at the completion of the moisture condensation. When dry nitrogen gas was thereafter fed for 25 minutes at a flow rate of 250 ml/min. to the inner tube, the electric resistance between both copper layer portions became infinitely great.

EXAMPLE 75

A 20% aqueous polymer solution of N-isopropylacrylamide was obtained in exactly the same manner as in Example 60 except that N-isopropylacrylamide was used in place of N-acryloylpyrrolidine. The aqueous polymer solution was diluted to 10% with distilled water, to which sodium p-toluenesulfonate was added and dissolved in such an amount that its concentration reached 1.0N. Using the thus-prepared solution, a sample chip was obtained in the same manner as in Example 67. Using this sample chip, the electric resistance between both copper layer portions and the relative humidity of exhausted nitrogen gas were measured in the same manner as in Example 67. The electric resistance was infinitely great prior to the feeding of the nitrogen gas. When moisture condensation had begun to occur, it was $1.5\times10^5\Omega$. When the inner tube had been fully covered by condensed water, it was $3.8\times10^4\Omega$. On the other hand, the relative humidity of the exhausted nitrogen gas was 4.2% at the beginning of the moisture condensation and 1.3% at the completion of the moisture condensation. When dry nitrogen gas was thereafter fed for 23 minutes at a flow rate of 250 ml/min. to the inner tube, the electric resistance between both copper layer portions became infinitely great.

EXAMPLE 76

A 30% N,N-dimethylformamide solution of N,N-diethylacrylamide was transferred to a Dewar vessel and the solution was purged with nitrogen. Thereafter, azoisobutyronitrile was added at 30° C. to 1.5%, followed by adiabatic polymerization. The resultant gel was chopped into small pieces and was then dried at 120° C. It was then ground into powder. This powder was dissolved in distilled water to obtain a 10% aqueous solution of N,N-diethylacrylamide, to which sodium perchlorate was added and dissolved in such an amount that its concentration reached 1.0N. Using the resultant solution, a sample chip was obtained in the same manner as in Example 67. Using this sample chip, the electric resistance between both copper layer portions and the relative humidity of the exhausted nitrogen gas were measured in the same manner as in Example 67. The electric resistance was infinitely great prior to the feeding of the nitrogen gas. When moisture condensation had begun to occur, it was $1.2\times10^5\Omega$. When the inner tube had been fully covered by condensed water, it was $2.8\times10^4\Omega$. On the other hand, the relative humidity of the exhausted nitrogen gas was 71.2% at the beginning of the moisture condensation and 77.1% at the completion of the moisture condensation. When dry nitrogen gas was thereafter fed for 22 minutes at a flow rate of 250 ml/min. to the inner tube, the electric resistance between both copper layer portions became infinitely great.

EXAMPLE 77

A 20% aqueous polymer solution of N-acryloylmorpholine was obtained in exactly the same manner as in Example 60 except that N-acryloylmorpholine was used in place of N-acryloylpyrrolidine. The aqueous polymer solution was diluted to 10% with distilled water, to which sodium chloride was added and dissolved in such an amount that its concentration reached 1.0N. Using the thus-prepared solution, a sample chip was obtained in the same manner as in Example 67. Using this sample chip, the electric resistance between both copper layer portions and the relative humidity of exhausted nitrogen gas were measured in the same manner as in Example 67. The electric resistance was infinitely great prior to the feeding of the nitrogen gas. When moisture condensation had begun to occur, it was $1.1\times10^5\Omega$. When the inner tube had been fully covered by condensed water, it was $7.6\times10^4\Omega$. On the other hand, the relative humidity of the exhausted nitrogen gas was 70.9% at the beginning of the moisture condensation and 72.7% at the completion of the moisture condensation. When dry nitrogen gas was thereafter fed for 24 minutes at a flow rate of 250 ml/min. to the inner tube, the electric resistance between both copper layer portions became infinitely great.

What is claimed is:

1. A process of humidity control by contacting humid gas with an agent for absorbing and releasing water vapor, said agent comprising the combination of:

(A) from 95 to 3 wt. % of a water insolubilized product prepared from:

(a) a homopolymer of a monomer selected from the group consisting of N-alkyl- and N-alkylene-substituted (meth)acrylamides of formula (I):

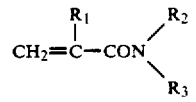

(I)

wherein $R_1$ is hydrogen or methyl, $R_2$ is hydrogen, methyl or ethyl, and $R_3$ is methyl, ethyl or propyl and formula (II):

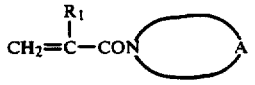

(II)

wherein $R_1$ is hydrogen or methyl, and A is $-(CH_2)_n-$, wherein n is an integer of 4 to 6, or $-(CH_2)_2-O-(CH_2)_2$;

(b) a first copolymer of at least two monomers selected from the group consisting of said N-alkyl- and N-alkylene-substituted (meth)acrylamides; or (c) a second copolymer of at least one monomer selected from the group consisting of said N-alkyl- and N-alkylene-substituted (meth)acrylamides and at least one monomer other than said N-alkyl- and N-alkylene-substituted (meth)acrylamides which is copolymerizable with the N-alkyl- and N-alkylene-substituted (meth)acrylamides; and (B) from 5 to 97% by wt. of a hygroscopic material selected from the group consisting of metal halides and metal perchlorates.

2. The process of claim 1, wherein said agent is water-insolubilized by copolymerizing at least one monomer of formula (I) and/or (II) with a crosslinkable monomer containing at least two double bonds per molecule in an amount of 0.01–10 wt. % relative to the total monomer.

3. The process of claim 1, wherein said agent is water-insolubilized by heating said homopolymer or said first or second copolymer to 60°–250° C.

4. The process of claim 1, wherein said agent is water-insolubilized by integrating said homopolymer or said first or second copolymer with solid materials.

5. The process of claim 4, wherein the integration process is conducted by impregnating or coating a solid material selected from the group consisting of fibrous materials and plate materials.

6. The process of claim 1, wherein the monomer is selected from the group consisting of N-n-propylacrylamide, N-n-propylmethacrylamide, N-isopropylacrylamide, N-isopropylmethacrylamide, N-ethylacrylamide, N,N-diethylacrylamide, N-ethyl-methacrylamide, N,N-diemethylacrylamide, N,N-dimethyl-methacrylamide and N-methyl-N-ethylacrylamide.

7. The process of claim 1, wherein the monomer of formula (II) is selected from the group consisting of N-acryloylpyrrolidine, N-methacryloylpyrrolidine, N-acryloylpiperidine, N-methacryloylpiperidine, N-acryloylmorpholine and N-methacryloylmorpholine.

8. The process of claim 7, wherein the monomer is selected from the group consisting of N-acryloylpyrrolidine, N-acryloylmorpholine and N-acryloylpiperidine.

9. The process of claim 8, wherein the monomer is selected from the group consisting of N-n-propylacrylamide N,N-diethylacrylamide and N-isopropylacrylamide.

*10. A process of preventing fogging of a transparent material by forming a layer of an agent thereon, comprising the steps of:*

*(A) forming a layer of said agent prepared from:*

*(a) a monomer or a homopolymer of a monomer selected from the group consisting of N-alkyl- and N-alkylene-substituted (meth)acrylamides of formula (I):*

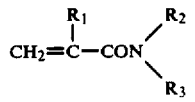

(I)

*wherein $R_1$ is hydrogen or methyl, $R_2$ is hydrogen, methyl or ethyl, and $R_3$ is methyl or ethyl and formula (II):*

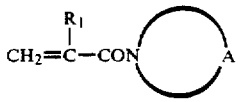

(II)

*wherein $R_1$ is hydrogen or methyl, and A is $-(CH_2)-_n$. wherein n is an integer of 4 to 6, $-(CH_2)_2-O-(CH_2)-_2$.*

*(b) a first comonomer or a first copolymer of at least two monomers selected from the group consisting of said N-alkyl- and N-alkylene-substituted (meth)acrylamides; or*

*(c) a second comonomer or a second copolymer of at least one monomer selected from the group consisting of said N-alkyl- and N-alkylene-substituted (meth)acrylamides and at least one monomer other than said N-alkyl and N-alkylene-substituted (meth)acrylamides which is copolymerizable with the N-alkyl- and N-alkylene-substituted (meth)acrylamides; and*

*(B) insolubilizing said agent by heating said layer to 60°–250° C. or by exposing said layer to UV light or δ-rays.*

*11. The process of claim 10, wherein the monomer of formula (I) is selected from the group consisting of N-ethylacrylamide, N,N-diethylacrylamide, N-ethylmethacrylamide, N,N-dimethylacrylamide, N,N-dimethylmethacrylamide and N-methyl-N-ethylacrylamide.*

*12. The process of claim 10, wherein the monomer of formula (II) is selected from the group consisting of N-acryloylpyrrolidine, N-methacryloylpyrrolidine, N-acryloylpiperidine, N-methacryloylpiperidine, N-acryloylmorpholine and N-methacryloylmorpholine.*

*13. The process of claim 11, wherein the monomer of formula (I) is N,N-diethylacrylamide.*

*14. The process of claim 12, wherein the monomer is further selected from the group consisting of N-acryloylpyrrolidine, N,acryloylmorpholine and N-acryloylpiperidine.*

* * * * *